United States Patent [19]

Morita et al.

[11] Patent Number: 5,019,212

[45] Date of Patent: May 28, 1991

[54] METHOD FOR PRODUCING GAS-PERMEABLE PARCELLING FILM

[75] Inventors: Yoshikazu Morita; Yoshiaki Inoue; Syuji Wakamatsu, all of Tokyo, Japan

[73] Assignee: Mitsubishi Gas Chemical Co., Japan

[21] Appl. No.: 391,662

[22] Filed: Aug. 8, 1989

Related U.S. Application Data

[62] Division of Ser. No. 186,166, Apr. 26, 1988, abandoned.

[30] Foreign Application Priority Data

Apr. 27, 1987 [JP] Japan ................................ 62-102012

[51] Int. Cl.$^5$ .............................................. D21H 13/00
[52] U.S. Cl. ................................... 162/157.3; 162/146; 162/157.5; 426/124; 428/296
[58] Field of Search ....................... 162/146, 168.1, 169, 162/157.3, 157.5; 426/124, 118, 131; 206/204; 215/228; 428/296

[56] References Cited

U.S. PATENT DOCUMENTS

| | | | |
|---|---|---|---|
| 2,999,788 | 9/1961 | Morgan | 162/157.3 |
| 3,184,373 | 5/1965 | Arledter | 162/168.1 |
| 3,528,879 | 9/1970 | Kometani et al. | 162/157.5 |
| 4,098,404 | 7/1978 | Markert | 426/124 |
| 4,132,591 | 1/1979 | Merges | 162/146 |
| 4,210,487 | 7/1980 | Driscoll | 162/146 |
| 4,212,703 | 7/1980 | D'Amico et al. | 162/146 |
| 4,274,915 | 6/1981 | Munari | 162/146 |
| 4,287,995 | 9/1981 | Moriya | 215/228 |
| 4,332,845 | 6/1982 | Nawata et al. | 428/35 |
| 4,399,161 | 8/1983 | Nakamura et al. | 426/541 |
| 4,421,235 | 12/1983 | Moriya | 206/524.2 |
| 4,485,133 | 11/1984 | Ohtsuka et al. | 428/35 |
| 4,487,791 | 12/1984 | Komatsu et al. | 428/35 |
| 4,491,502 | 1/1985 | Martin | 162/146 |
| 4,579,223 | 4/1986 | Otsuka et al. | 206/204 |
| 4,657,133 | 4/1987 | Komatsu et al. | 206/204 |
| 4,667,814 | 5/1987 | Wakamatsu et al. | 206/0.7 |
| 4,756,436 | 7/1988 | Morita et al. | 215/228 |
| 4,769,109 | 9/1988 | Tellvik et al. | 162/169 |

FOREIGN PATENT DOCUMENTS

| | | | |
|---|---|---|---|
| 50-130554 | 10/1975 | Japan . | |
| 5444253 | 8/1977 | Japan . | |
| 5580261 | 11/1978 | Japan . | |
| 58-41995 | 3/1983 | Japan | 162/169 |
| 58-64959 | 4/1983 | Japan . | |
| 60-104600 | 6/1985 | Japan . | |
| 60-297784 | 12/1985 | Japan . | |
| 572962 | 10/1945 | United Kingdom | 162/146 |

OTHER PUBLICATIONS

Research Disclosure No. 21535, Mar. 1982, No. 215.

*Primary Examiner*—George Yeung
*Attorney, Agent, or Firm*—Leydig, Voit & Mayer

[57] ABSTRACT

The present invention provides a method of producing a gas-permeable parcelling film for use in a container for isolating a product to be preserved from a freshness keeping agent placed within the container. The parcelling film has a gas-permeable formed member which is obtained by subjecting plastic fibers to a paper-making process and a drying process to obtain a dried sheet of plastic fibers, and then subjecting the dried sheet to a forming process into the formed member. The parcelling film is impregnated with fluororesin, before being subjected to the forming process.

28 Claims, 6 Drawing Sheets

METHOD FOR PRODUCING GAS-PERMEABLE PARCELLING FILM

This application is a divisional of application Ser. No. 07/186,166, filed Apr. 26, 1988, now abandoned.

BACKGROUND OF THE INVENTION

The present invention relates to a method of producing parcelling or packaging film for parcelling a freshness keeping agent and to a closed container or package within which is placed a package employing such parcelling film and freshness keeping agent together with a food, medicine or the like for the purpose of preserving freshness of such an object.

Hitherto, freshness keeping agents such as drying agents, antiseptics, insecticides, de-oxidizers and so forth have been used for the purpose of preventing deterioration, of the quality of a food, medicine or the like (such substances referred to generally as "object" hereinafter) attributable to the influence of moisture, oxygen or microorganisms so as to keep such an object fresh. These freshness keeping agents are sealed in a closed container together with the object. It has been often experienced that the freshness keeping agent is contaminated by oil or water of the food due to direct contact between the object and the freshness keeping agent, with the result that the function of the freshness keeping agent is impaired. Another problem is that the freshness keeping agent is mixed with the object so as to be eaten.

In order to avoid such inconveniences and problems, it has been a common practice to parcel the freshness keeping agent so as to isolate it from the object within the closed container. Practically, a separation film is provided on a portion of the container such that the object and the freshness keeping agent are disposed on opposite sides of the film so as to be isolated from each other.

For instance, Japanese Utility Model Unexamined Publication No. 50-130554 discloses a container for preventing degradation of the content in which an oxygen absorber parcel is attached to an inner surface of a container such as a bottle, can or the like so as to face the interior of the container, the oxygen absorber parcel consisting of a chemical agent which produces carbon dioxide upon absorption of oxygen parcelled in a gas-permeable plastic material such as a low-density polyethylene film. The gas-permeable material isolating the chemical agent and the content, which is made from a plastic film such as polyethylene film, exhibits a large resistance to the permeation of the oxygen or carbon dioxide gas, so that the parcel could not function effectively when used for the purpose of maintaining the freshness of an object such as food which tends to be degraded quickly.

Japanese Utility Model Unexamined Publication No. 54-44253 discloses a formed closed container in which a pocket is provided on an inner lid formed on a stepped portion of the formed closed container and a quality preserving agent is placed in the pocket. In this container, the inner lid is merely placed on a step of the container so that there is a risk of the contents entering the compartment of the quality preserving agent in the event the container is dropped, particularly when the contents is a powder or a liquid. Thus, this container cannot isolate the agent and object.

Furthermore, Japanese Utility Model Unexamined Publication No. 55-80261 discloses a cap for closing the mouth of a container, the cap being provided at the side facing the interior of the container with a deoxidizing agent by means of an oxygen permeable material having minute pores and capable of preventing permeation of liquids therethrough. The oxygen-permeable material used in this art is produced by cold orientation of a film made of polypropylene, polyethylene fluoride or the like.

This film material, however, has inferior formability, although it exhibits excellent gas-permeability while preventing permeation of liquids. The term "formability" is used in this specification to mean an enabling nature of a material to be formed into a specific stable form. Namely, this film material tends to exhibit thermal contraction and cracking at corners even when the forming is effected in a vacuum atmosphere, so that it cannot constitute a de-oxidizing agent parcel having a high degree of practicalness. The forming of this film has to be effected such that the oxygen permeable material has a small thickness and the de-oxidizing agent housing portion has to be made by making use of elongation of the material. Thus, the film material used in this art is still unsatisfactory in the aspects of producibility and strength. In addition, the oxygen permeable materials used in this art generally have poor resistance to oil and alcohol, so that the film material tend to allow permeation of oil or alcohol when the contents or object to be preserved contains oil or alcohol, with the result that the gas-permeability is impaired with deterioration the performance of the de-oxidizing agent.

In order to overcome these problems, Japanese Patent Unexamined Publication No. 58-64959 discloses an art in which a parcelling material made of a porous film or a non-woven cloth is impregnated or coated with a fluororesin. Such porous film or non-woven cloth is hydrophobic so that the fluororesin with which the film or cloth is impregnated or coated cannot sufficiently penetrate into the entire portion of the film material or fibrous structure of the cloth. Namely, the fluororesin is present only on the surface region of the parcelling material. Thus, the parcelling material used in this art cannot provide sufficient resistance to oil and alcohol. The porous film or the non-woven cloth has local portions having large pores so that oil or alcohol tends to reach the de-oxidizing agent in the parcel through such large pores, despite the presence of fluororesin with which the parcelling material is impregnated or coated. It has proved also that the de-oxidizing agent parcel formed from this parcelling material faces the same problem as that encountered with the art of Japanese Utility Model Unexamined Publication No. 55-80261, i.e., inferior producibility and material strength.

Thus, all the known parcelling materials for parcelling freshness keeping agent require improvement in the aspects of gas-permeability, strength, simplicity of construction and producibility.

SUMMARY OF THE INVENTION

Accordingly, an object of the present invention is to provide a parcelling material and to a package formed from such material for parcelling or packaging a freshness keeping agent in such a manner that the freshness keeping agent and an object to be preserved such as a foodstuff are isolated from each other in a common sealed container, the parcelling material being improved to exhibit superior formability, strength, rigidity and gas-permeability, while preventing any degradation of performance of the freshness keeping agent.

A sheet material formed by subjecting fibers of plastics such as polyethylene, polypropylene or the like to wet paper-making process exhibits water-permeability, thus failing to provide waterproofness. The inventors have found that this sheet can be formed by, for example, heat-pressing into a formed product having a high gas-permeability, waterproofness, strength and rigidity. The present invention is based upon this discovery.

Thus, the present invention provides a container for a product to be preserved comprising: a freshness keeping agent placed within the container; and a parcelling film which isolates the product and the freshness keeping agent from each other within the container, the parcelling film comprising a gas-permeable formed member which is obtained by subjecting a plastic fiber sheet to a paper-making process, drying the processed sheet formed from thermoplastic fibers and then subjecting the dried sheet to a forming process to produce a formed member of predetermined shape. According to the invention, the sheet material after the drying may be formed into the desired shape by various methods after being subjected to heat and pressure exerted by a heat roll. A parcelling material for parcelling a freshness keeping agent, produced by such methods, provides further improved strength and rigidity.

In a specific form of the present invention, the sheet material obtained by subjecting plastic fibers to paper making process and then to drying is impregnated with a fluororesin. The fluororesin can penetrate into the sheet so as to attach to all parts of the fibers constituting the sheet. This sheet is then conveniently formed into a desired form by, for example, a heat press. This product can be used as a freshness keeping agent parcelling material which exhibits a high degree of anti-alcohol and anti-oil characteristics which could never be attained by known materials, as well as improvement in the gas-permeability and waterproofness.

Furthermore, the sheet material impregnated with fluororesin and processed by application of heat and pressure can be formed into desired forms by various forming methods. A freshness keeping agent parcelling material formed from this material exhibits still further improvement in the strength and rigidity.

The parcelling film of the present invention is placed in a sealed container together with an object to be preserved in such a manner as to isolate the freshness keeping agent and the object from each other within the container.

According to the invention, a gas-permeable formed member is used as the parcelling film. In general, the gas-permeable formed member is mounted in the container in such a manner as to be disposed convex to the interior of the container. Thus, the formed member provides a concavity which, in cooperation with the inner surface of the container, defines a space for holding the freshness keeping agent.

The gas-permeable formed member used as the parcelling material of the invention may be formed by various methods. For instance, the gas-permeable parcelling member is formed by subjecting plastic fibers to a paper-making process, followed by drying and forming. A method comprising the steps of subjecting plastic fibers to a paper-making process, drying the processed fibers, impregnating the dried fibers with a fluororesin such that the fluororesin attaches to whole fibers, drying the impregnated fibers and then forming the dried fibers into desired form. The method also may be such that plastic fibers after being subjected to paper making process are dried followed by processing by a heat press or a heat roll and a subsequent forming process so as to be formed into a desired form. A method also may be employed which has the steps of subjecting plastic fibers to paper-making process, drying the processed fibers, impregnating the dried fibers with a fluororesin such that the fluororesin can attach to entire fibers, drying the impregnated fibers, and forming the dried fibers into a desired form by a heat press or a heat roll.

The plastic fibers used in the present invention may be prepared by various processes. For instance, the fibers may be formed by flushing a polymer solution into a non-solvent which is being stirred at a high speed. It is also possible to directly form fibers by effecting shearing of the polymeric material in a polymerization tank. A process known as a flushing method also may be employed in which fibers are formed by flush spinning followed by beating. In another method known as a drawing method, a sheet formed by extrusion is longitudinally drawn and then split, followed by beating. Among these methods, the flushing method is used most conveniently.

The plastic fibers used in the present invention may be one or more selected from a group consisting of polyolefins such as polyethylene and polypropylene, polyamides such as nylon, and polyesters such as polyethylene terephthalate. Among these materials, most suitably used are a material consisting of polyethylene or polypropylene, as well as materials such as polyethylene/polypropylene, polyethylene/polyethylene terephthalate, and polyethylene/polypropylene/-polyethylene terephthalate. These plastic fibers are preferably used with addition of polyvinyl alcohol thereto, in order that they are well suspended in water during execution of the paper-making process. The diameter of pores is preferably not greater than $50\mu$. To this end, the width of the fibers is selected to be as small as possible, preferably not greater than $50\mu$ and more preferably not greater than $30\mu$. The length of the fibers usually ranges between 0.1 and 200 mm.

The plastic fibers are suspended in water together with additives such as a dispersion agent and a defoaming agent. The thus obtained plastic fiber suspension liquid is introduced into a paper making machine and is screened by wires. After suction dehydration, the processed fibers are made to pass through a dryer so as to be dried, thus becoming a sheet material. There is no restriction in the density of the plastic fibers when these fibers are suspended in water. From the view point of efficiency of the paper-making work, however, the density is selected to fall within the range of between 0.1 and 10 wt %, preferably between 0.5 and 5 wt %. The temperature and the time of the drying after the paper-making process also may be selected without any restriction, though it is preferred that the drying is effected to such a degree that the water content of the sheet material is not greater than 0.1%. The basis weight of the dried sheet material is determined to range between 20 and 500 g/m$^2$, preferably between 40 and 300 g/m$^2$, based on considerations of gas-permeability, strength and economy. The thus obtained sheet material is not waterproof and allows water to easily permeate therethrough, although it has an appreciable level of gas-permeability.

The sheet material obtained through the paper-making process and the subsequent drying may be impregnated with a fluororesin, so that it may constitute a formed member having further improved characteristics.

The impregnation with fluororesin, when employed, is conducted by preparing an emulsion with the fluororesin dispersed in an aqueous solution or a solution formed by dissolving fluororesin in a solvent, dipping the sheet material in the emulsion or the solution or causing the sheet material to contact with the emulsion or the solution so as to impregnate the sheet material with the fluororesin, and drying the impregnated sheet material.

The fluororesin with which the sheet material is impregnated is not limited. Examples of the fluororesin suitably used are ethylene tetrafluoride, ethylene tetrafluoride-propylene hexafluoride copolymer, ethylene tetrafluoride-fluoroalkoxyethylene copolymer, ethylene trifluoride, and their derivatives. The fluororesin is added in amount of 0.1 to 10 weight parts, preferably 0.5 to 5 weight parts, to 100 weight parts of plastic fibers.

The thus obtained sheet material is then formed into desired form by a suitable method such as vacuum forming, blow forming, a forming method which employs an auxiliary plug, and compression forming. Among these methods, most suitably used are a vacuum forming method and a compression forming method. The sheet material which has undergone the forming process constitutes a gas-permeable formed member which is usable as the freshness keeping agent parcelling film of the present invention.

According to the present invention, the forming process is an operation effected on the sheet material so as to give to the sheet material a definite shape and thickness, as well as strength and rigidity, suitable for containing the freshness keeping agent.

When the compression forming method is used, the sheet material is pressed at a temperature of 60° to 200° C., preferably 70° to 150° C., and at a pressure of 0.1 to 5 kg/cm$^2$, preferably 0.1 to 3 kg/cm$^2$, for a period of 0.1 to 180 seconds, preferably 0.2 to 150 seconds. When the vacuum forming method is used, the sheet material is formed at a temperature of 60° to 200° C., preferably 70° to 150° C., and at a reduced pressure of 100 to 700 mm Hg, preferably 200 to 600 mm Hg, for a period which is 0.1 to 150 seconds, preferably 0.2 to 120 seconds.

It is possible to improve strength and rigidity of the product by subjecting the sheet material to a heat-roll process in advance of the forming operation.

The heating and pressing conditions in the heat roll process should be determined such as to cause the surface of the sheet to be fused and to cause the plastic fibers to be thermally welded together at the points of intersection. Practically, the heat roll process is executed at a temperature which ranges between 120° and 140° C., preferably 125° and 135° C., and a pressure which ranges between 0.5 and 6 kg/cm$^2$, preferably 3 and 5 kg/cm$^2$.

Preferably, the thickness of the shaped member according to the present invention has a thickness which is generally not greater than 2 mm, preferably 0.4 mm or less.

The container which is used together with the parcel made of the parcelling material of the invention may be of any type, provided that it has a structure for allowing the interior to be shielded from the ambient air. For instance, the container may be made from a metal, glass, plastic, a laminated structure of paper and plastic, ceramics and so forth. The container can have any desired form such as cylindrical form, sack-like form, tray-like form and so forth.

The parcelling film of the invention can form a freshness keeping agent parcel capable of parcelling various types of agents such as drying agents, antiseptics, insecticides, deodorants, ethylene absorbers, de-oxidizers and so on. Any types of de-oxidizers capable of absorbing oxygen can be used in the parcel made of the parcelling film of the invention. Examples of such de-oxidizer are sulfite, hydrogensulfite, dithionite, ferrous salt, hydroquinone, catechol, resorcin, pyrogallol, gallic acid, Rongalit, ascorbic acid and/or its salt, isoascorbic acid and/or its salt, sorbose, glucose, lignin, dibutyl hydroxytoluene and butyl hydroxyanisole. It is also possible to use de-oxidizers which contain powdered metal such as iron powder. Among these de-oxidizers, suitably used are ascorbic acid and/or its salt, isoascorbic acid and/or its salt, and a de-oxidizer containing powder of iron, particularly the de-oxidizer containing powder of iron. De-oxidizers of carbon dioxide generation type and carbon dioxide absorption type are also usable. No limitation is posed on the form of the de-oxidizer packaged in the formed member. Preferably, however, the de-oxidizers are used in the form of a mixture of powders of the above-mentioned de-oxidizing compositions, tablets formed from the above-mentioned de-oxidizing compositions, sheets formed from these compositions by a suitable method, and a sack of a gas-permeable material charged with a de-oxidizing composition.

The parcelling film according to the invention divides the interior of a closed container into a parcel portion in which the freshness keeping agent is packaged and a container portion for containing the object to be preserved. Thus, the object to be preserved and the freshness keeping agent which are contained in the container are isolated from each other by the parcelling film of the invention.

Preferably, the formed member of the invention has an extremely high level of gas-permeability which is on the order of 0.1 to 300 seconds/100 ml in$^2$ in terms of Gurley permeability as specified in JIS (Japanese Industrial Standards) P 8117.

As has been explained, the parcelling film of the invention for housing a freshness keeping agent is a gas-permeable formed member which is produced by subjecting plastic fibers to a paper-making process, drying the plastic fibers, impregnating, as desired, the plastic fibers with a fluororesin followed by drying, and forming the fibers into desired form and thickness by, for example, a heat press. The thus obtained gas-permeable parcelling film is used as a partition which divides the interior of a container into two sections, i.e., a parcel or package section for parcelling the freshness keeping agent and a container section for containing the object to be preserved. This partition, by virtue of its high gas-permeability, enables the effect of the freshness keeping agent to be fully exerted, thus ensuring a long storage of the object contained in the container.

The invention will be more fully understood from the following description of the embodiments when the same is read in conjunction with the accompanying drawings.

DESCRIPTION OF THE PREFERRED EMBODIMENTS

Examples of application of the freshness keeping agent parcelling film according to the present invention to various types of containers will be shown below.

Figure 1:
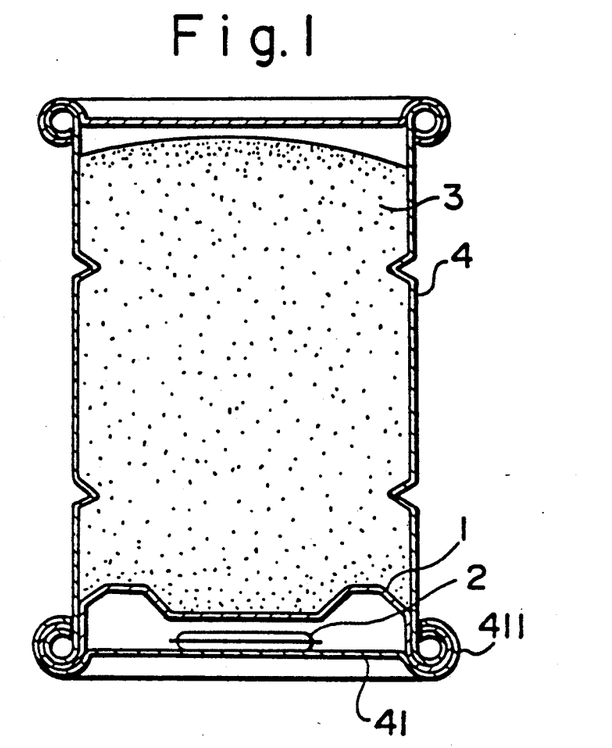
FIGS. 1, 2, 6 and 7 are sectional views of metallic or plastic containers, having a freshness keeping agent parcelling or packaging film in accordance with the present invention.

FIG. 1 illustrates an example in which the parcelling film of the invention is applied to a container for powdered, granular or strip-shaped contents such as coffee grains, powdered milk, medicine and so forth. More specifically, referring to FIG. 1, a reference numeral 1 designates a freshness keeping agent parcelling film according to the invention, i.e., a gas-permeable formed member. Numerals 2, 3 and 4 denote, respectively, a freshness keeping agent, an object to be preserved and a container. The container 4 may be formed of a metallic, paper or a plastic material. The freshness keeping agent 2 is disposed in a space which is formed between the gas-permeable formed member 1 and the bottom lid 41 of the container. The peripheral edges of the gas-permeable formed member and the peripheral edge of the bottom lid 41 are superposed on each other and crimped together, thus forming a crimped edge 411.

Figure 2:
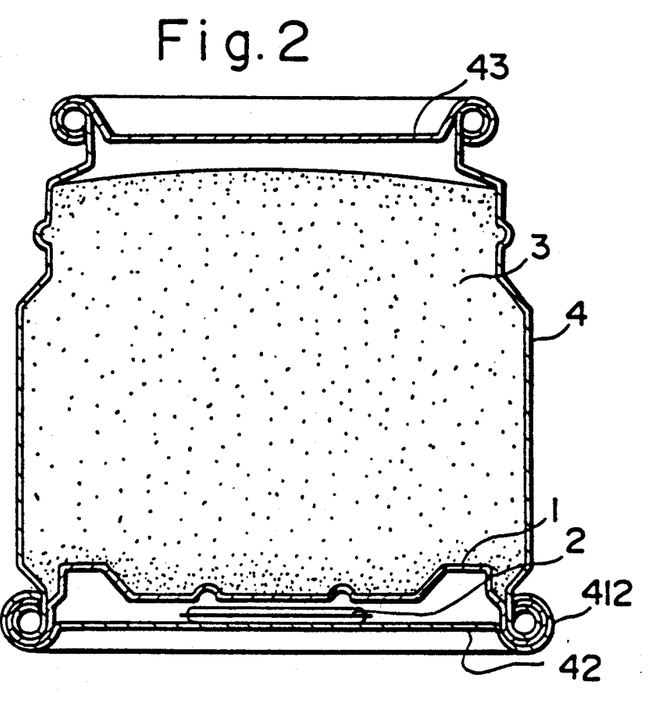

FIG. 2 illustrates, by way of example, an application of the invention to a container which contains fine particles such as particulated green tea. In this case, the container 4 is made from a material such as a metal, and has a pull-top type lid 43. The freshness keeping agent is placed in a space which is defined by the bottom plate 42 of the container and the gas-permeable formed member 1. The peripheral edge of the gas-permeable formed member and the peripheral edge of the bottom plate 42 of the container are superposed on each other and crimped together to form a crimped portion 412.

Figure 3:
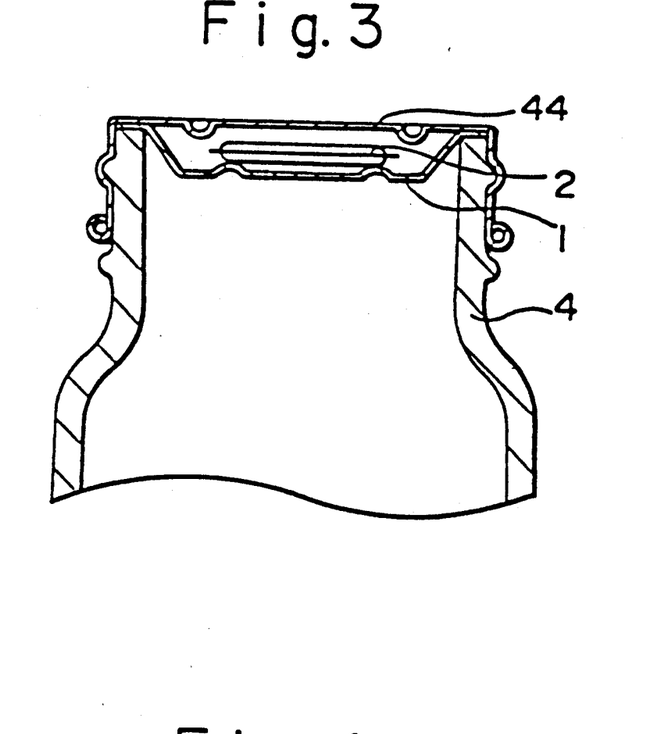
FIGS. 3 and 4 are sectional views of glass or plastic wide-mouthed bottle having a freshness keeping agent parcelling film in accordance with the present invention.

FIG. 3 illustrates, by way of example, an application of the present invention to a wide-mouthed bottle suitable for use as a container of a powdered, granular, strip-shaped or scale-shaped material. The container 4 is made from a glass or plastic material. The bottle has a screw-type lid 44. The freshness keeping agent is placed in the space defined between the gas-permeable formed member 1 and the lid 44 of the container. A packing may be provided along the peripheral edge of the formed member between the lid 44 and the peripheral edge of the formed member or between the peripheral edge of the formed member and the open upper end of the container.

Figure 4:
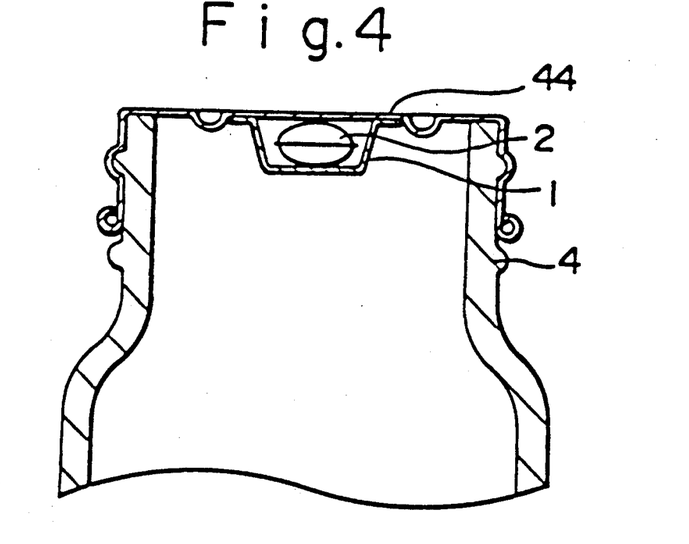

FIG. 4 also shows, by way of example, an application to a wide-mouthed bottle made of a glass or a plastic. This bottle has a screw-type lid 44. The freshness keeping agent 2 is disposed in a space defined by the gas-permeable formed member 1 and the lid 44. The gas-permeable formed member 1 is attached to the reverse side of the lid 44.

Figure 5:
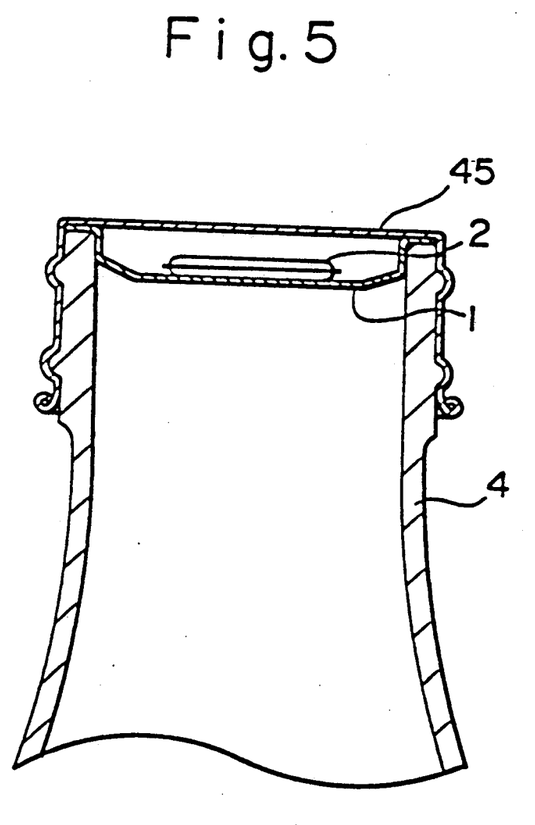
FIG. 5 is a sectional view of a screw-cap type bottle made of as glass, plastic or ceramic, having a freshness keeping agent parcelling film in accordance with the present invention.

FIG. 5 shows, by way of an example, an application of the invention to a bottle having a screw-type cap, suitable for use in a container of a liquid or semi-liquid article. The container 4, i.e., the bottle, is made of a glass, ceramic or plastic. The freshness keeping agent 2 is placed between the gas-permeable formed member 1 and the screw cap 45, while the gas-permeable formed member 1 is positioned such that its peripheral edge is sandwiched between the reverse side of the screw cap 45 and the upper end of the container body. The container may employ a packing similar to that explained before in connection with FIG. 3.

Figure 6:
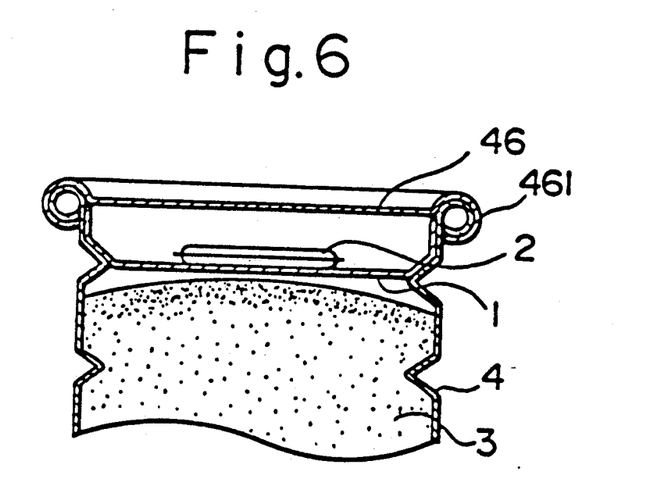

FIG. 6 illustrates, by way of example, an application to a container for a powder, granular or strip-shaped object such as coffee grains, powdered milk, medicine or the like. The container 4 in this example is made from a material such as a metal, paper, plastic or laminated structure of paper and plastic. The freshness keeping agent 2 is placed in the space formed between the gas-permeable formed member 1 and an upper lid 46 which has portion 461 crimped together with the container, in such a manner that it rests on the gas-permeable formed member 1. The gas-permeable formed member 1 is fixed by means of an inner peripheral projection on the container body 4.

Figure 7:
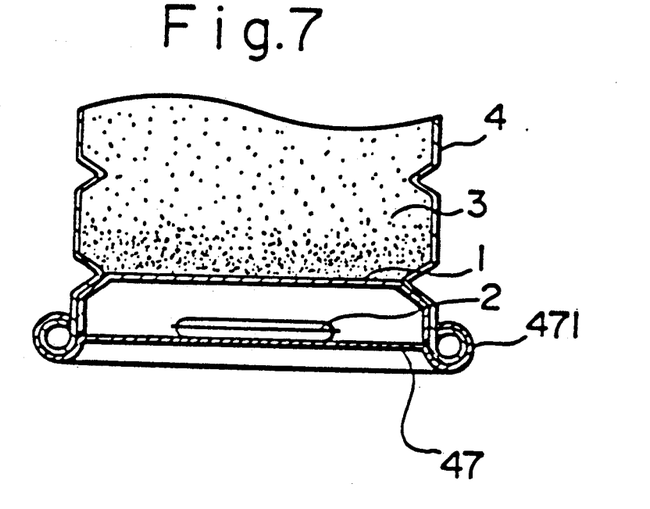

FIG. 7 shows, by way of example, an application of the present invention to a container for a powder, granular or strip-shaped object such as coffee grains, powdered milk, medicine or the like. In this case, however, a crimped portion 471 is provided on the bottom lid 47.

Figure 8:
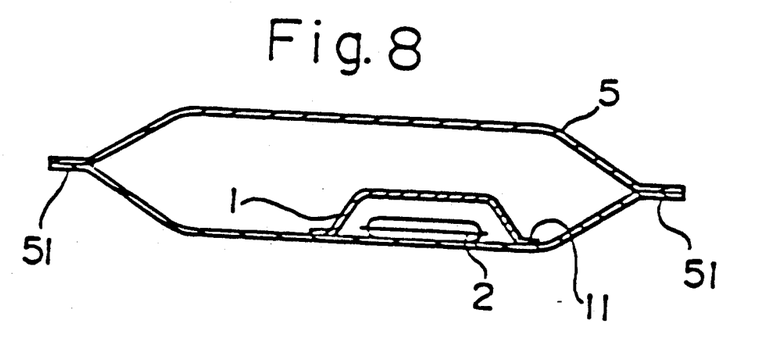
FIG. 8 is a sectional view of a parcel of a freshness keeping agent, formed from a freshness keeping agent parcelling material of the present invention.

FIG. 8 illustrates, by way of example, an application of the present invention to a package or a sack. The freshness keeping agent is placed between a gas-permeable member 1 and a lower wall of a package or a sack material which is not permeable to gas. The gas-permeable formed member is fixed at its peripheral edge to the lower wall of the sack 5 in a sealing manner.

Figure 9:
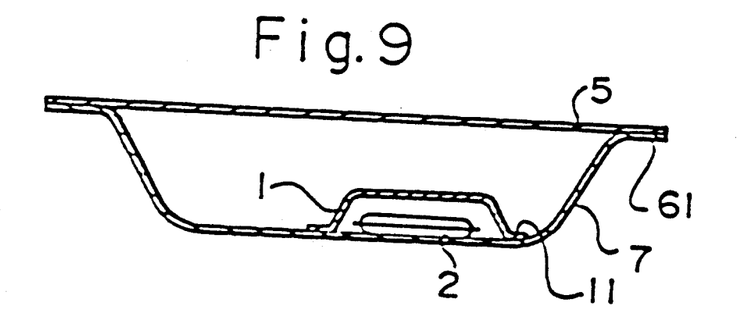
FIGS. 9 and 10 are sectional views of trays having a freshness keeping agent parcelling film in accordance with the present invention.
Figure 10:
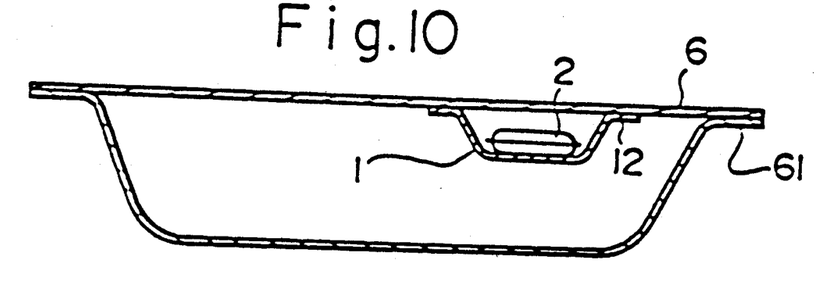

FIGS. 9 and 10 illustrate, by way of example, trays as containers which incorporate the freshness keeping agent parcelling film of the invention. Referring first to FIG. 9, the freshness keeping agent 2 is placed in a space formed between the gas-permeable formed member 1 and the lower wall of the tray 7. The gas-permeable formed member 1 is fixed at its peripheral edge to the lower wall of the tray 7 in a sealing manner. Referring now to FIG. 10, the freshness keeping agent 2 is placed between the gas-permeable formed member 1 and the reverse side of a gas impermeable member 6 which constitutes a lid on the tray 7. The gas-permeable formed member 1 is fixed in a sealing manner to the reverse side of the gas-impermeable member 6.

EXAMPLES

A description will be made hereinafter as to some examples of the parcelling film of the invention for parcelling a freshness keeping agent.

EXAMPLE 1

Preparation of Sheet Material

Each of the plastic fiber materials shown in Table 1 are dispersed in water in an amount of 1 wt %. The plastic fiber suspension liquid thus obtained was introduced to a paper-making machine and was subjected to paper making process. In this process, the water content of the plastic fiber suspension liquid was removed by means of a metal gauze wire so that a sheet of paper was prepared. The paper sheet was then dehydrated by being pinched between a pair of rolls, at a pressure of 1 kg/cm². The sheet was then dried at 100° C. for 1 minute, so that a sheet material having a water content of 0.1% or less and a basis weight of 120 g/m² was obtained.

The kinds of the plastic fibers, composition ratios of the respective fibers and Gurley gas-permeability of the sheet materials are shown in Table 1.

TABLE 1

| Sample sheets | Type of plastic fibers used | Composition weight ratio (%) | Gurley gas-permeability (sec/100 ml) |
|---|---|---|---|
| A | Polyethylene fibers (Mean fiber length 0.9 to 1.3 mm, infinite form) | 100 | 2 |
| B | Polyethylene fibers (Mean fiber length 0.9 to 1.3 mm, infinite form) | 50 | 3 |
| | Polyethylene/polypropylene composite fiber (0.02 mm dia. × 10 mm long) | 50 | |
| C | Polyethylene fibers (Mean fiber length 0.9 to 1.3 mm, infinite form) | 50 | 3 |
| | Polyethylene/polypropylene composite fiber (0.02 mm dia. × 10 mm long) | 50 | |
| | Polyester fiber (0.015 mm dia. × 10 mm long) | | |

EXAMPLE 2

Method of Preparing Freshness Keeping Agent Parcelling Film, i.e., Gas-permeable Formed Member The sheet materials obtained in Example 1 were subjected to a vacuum forming process so as to be formed into a freshness keeping agent parcelling film.

Figure 11:
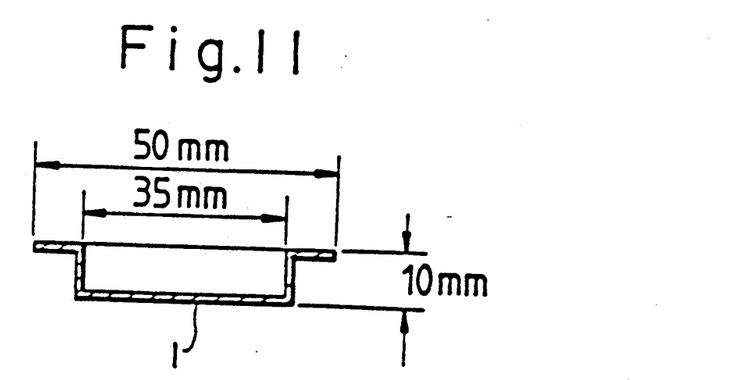
FIG. 11 is a sectional view of a second embodiment of the freshness keeping agent parcelling film in accordance with the present invention.

More specifically, each of the sheet materials obtained in Embodiment 1 was heated and softened by means of a pre-heating roll and was sucked by means of a forming roll heated to a predetermined temperature at a vacuum of 500 mm hg, whereby a parcelling film 1 was formed into a form resembling an ashtray, having an outer peripheral length of 50 mm, inner peripheral length of 35 mm, flange width of 7.5 mm and a depth of 10 mm (see FIG. 11).

The conditions and states of the forming are shown in Table 2, in which the same symbols are used to represent the sheet materials as those used in Table 1.

COMPARISON EXAMPLE 1

Sheet materials were subjected to forming under the same conditions as those in Example 2, except that a fine porous film (commercial name DURAGUARD, manufactured by Cellanese Company, USA) was used in place of the sheet materials obtained in Example 1.

In these comparison examples, however, the forming could not be executed due to thermal contraction of the sheet material when the pre-heating roll temperature or the forming roll temperature exceeded 90° C. On the other hand, a pre-heating roll temperature or the forming roll temperature below 80° C. impeded the forming due to insufficient softening of the resin. When the temperature of the pre-heating roll or the forming roll ranged between 80° and 90° C., it was very difficult to conduct practical forming due to cut offset attributable to thermal

TABLE 2

| | | Forming Conditions | | | | |
|---|---|---|---|---|---|---|
| | | Forming Temp. | | | | |
| Parcelling Film No. | Sheet Materials | Pre-heat roll (°C.) | Forming roll (°C.) | Forming Speed (pcs/min) | Forming Time (sec) | State of Forming |
| 1 | A | 130 | 124 | 60 | 1 | Forming Possible |
| 2 | B | 135 | 128 | 60 | 1 | Forming Possible |
| 3 | C | 145 | 138 | 60 | 1 | Forming Possible |
| 4 | A | 110 | 105 | 10 | 6 | Forming Possible |
| 5 | A | 95 | 91 | 5 | 12 | Forming Possible |
| 6 | A | 75 | 72 | 3 | 20 | Forming Possible |
| 7 | C | 165 | 156 | 50 | 1.2 | Forming Possible |
| 8 | C | 185 | 175 | 50 | 1.2 | Forming Possible |
| 9 | C | 210 | 198 | 200 | 0.3 | Forming Possible |

COMPARISON EXAMPLE 2

Sheet materials were subjected to forming under the same conditions as those in Example 2, except that a non-woven cloth (commercial name TYVEK, manufactured by Du Pont, USA) was used in place of the sheet materials obtained in Example 1. In these comparison examples, however, the forming could not be executed due to melting of the sheet material when the pre-heating roll temperature or the forming roll temperature exceeded 150° C. On the other hand, when the temperature of the forming roll was below 150° C., no substantial elongation of the sheet material by vacuum suction was effected. Thus, the forming was materially impossible.

EXAMPLE 3

Figure 12:
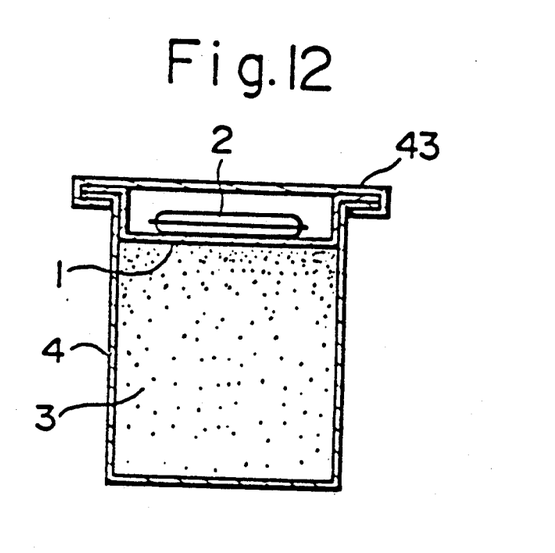
FIG. 12 is a sectional view of a third embodiment of the freshness keeping agent parcelling film in accordance with the present invention.

Referring to FIG. 12, the gas-permeable formed members (parcelling films) obtained in Example 2 were prepared together with a de-oxidizer (commercial name AGELESS Z-20, produced by Mitsubishi Gas CHEMICAL COMPANY,INC, size 30 mm×40 mm). 60 g of soybean powder generally designated at 2 was placed in a cylindrical metallic can 4 having a diameter of 50 mm and a depth of 80 mm. The gas-permeable formed member 1 was secured to a metallic lid 43 of the metallic can such as to define therebetween a space in which the de-oxidizer 2 was placed. A peripheral flange portion of the gas-permeable formed member 1 was superposed on and crimped together with the outer peripheral edge of the metallic lid 43, thus sealing the space accommodating the de-oxidizing agent.

The can was shelved at 25° C. and the time was measured until the oxygen concentration in the system reaches 0.1%. This time will be referred to as de-oxidation time, hereinafter. Measurement also was conducted on the change in the peroxide value of the oily content in the soybean powder in relation to time, as well as a change in the acid value in relation to time. The results are shown in Table 3.

COMPARISON EXAMPLE 3

A shelving test was conducted by using the same soybean powder under the same conditions as Example 3, except that the de-oxidizer was not used in this case. The results are also shown in Table 3.

COMPARISON EXAMPLE 4

The same sheet materials as those used in Example 1 were subjected to vacuum forming process which was conducted by employing a pre-heating roll of 80° to 90° C. and a forming roll which also was heated to 80° to 90° C. An attempt to mount the thus obtained parcelling films (gas-permeable formed members) to metallic cans in the same manner as Example 3 was unsuccessful due to a fact that the parcelling film was deformed by the weight of the de-oxidizing agent and the weight of the film itself, due to too small strength and rigidity of the parcelling film.

TABLE 3

| Parcelling Film No. | De-oxidation time (Hr) | State of Oxidation of Oil Content of Soybean Powder | | | |
|---|---|---|---|---|---|
| | | Peroxide Value (mg/kg) | | Acid Value (mgKOH/g) | |
| | | 1 month | 2 months | 1 month | 2 months |
| Example 3  1 | 36 | 0.5 | 0.5 | 2.9 | 3.0 |
| 2 | 34 | 0.4 | 0.5 | 2.8 | 3.1 |
| 3 | 37 | 0.6 | 0.6 | 2.9 | 3.0 |
| 4 | 30 | 0.5 | 0.5 | 2.9 | 2.9 |
| 5 | 27 | 0.4 | 0.4 | 2.7 | 2.7 |
| 6 | 25 | 0.5 | 0.5 | 2.8 | 2.9 |
| 7 | 37 | 0.5 | 0.5 | 2.9 | 2.9 |
| 8 | 38 | 0.4 | 0.4 | 3.0 | 3.0 |
| 9 | 40 | 0.6 | 0.6 | 2.9 | 3.0 |
| Comparison  1 | | 2.0 | 8.0 | 3.5 | 6.1 |

TABLE 3-continued

| Parcelling Film No. | De-oxidation time (Hr) | State of Oxidation of Oil Content of Soybean Powder | | | |
|---|---|---|---|---|---|
| | | Peroxide Value (mg/kg) | | Acid Value (mgKOH/g) | |
| | | 1 month | 2 months | 1 month | 2 months |
| Example 3 | | | | | |

EXAMPLE 4

Each of the sheet materials obtained in Example 1 was made to pass at a speed of 10 m/min through a nip between a pair of rolls which were heated to 140° C. and pressed together at a pressure of 6 kg/cm$^2$, whereby a gas-permeable sheet with plastic fibers welded together was prepared.

A gas-permeable formed member (parcelling film) was produced by the vacuum forming method which was conducted under the same conditions as Example 2. Using this parcelling film, a shelving test was conducted using soybean powder, under the same conditions as Example 3.

Table 4 shows the Gurley gas-permeability, conditions of forming into formed member, forming state and de-oxidation time measured during the shelving test.

TABLE 4

| Parcelling Film No. | Sheet Material | Gas-Permeability (sec/100 ml) | Forming Condition | | States of Forming | De-oxidation time (Hr) |
|---|---|---|---|---|---|---|
| | | | Form Roll Temp (°C.) | Forming Time (sec) | | |
| 11 | A | 9 | 124 | 1 | Forming possible | 40 |
| 12 | B | 12 | 128 | 1 | Forming possible | 38 |
| 13 | C | 13 | 138 | 1 | Forming possible | 40 |

EXAMPLE 5

Each of the sheet materials obtained in Example 1 was impregnated with an aqueous solution of a water- and oil-repellent agent (commercial name ASAHI GUARD AG530, produced by Asahi Glass Kabushiki Kaisha), followed by drying for 5 minutes at 60° C. The aqueous solution had fluororesin content of 2 wt %, and was applied in amount of 25 to 50 weight parts to 100 weight parts of the sheet material.

The sheet impregnated with the water- and oil-repellent agent was made to pass through the nip between a pair of rolls which were heated to 140° C. and pressed at a pressure of 6 kg/cm$^2$, at a speed of 10 m/min, whereby a gas-permeable sheet with plastic fibers welded together was obtained. The thus obtained gas-permeable sheets were subjected to measurement of Gurley gas-permeability which was conducted by a method as specified in JIS P-8117. A test for examining resistance to oil was conducted by dipping the gas-permeable sheets in a soybean oil. Similarly, resistance to alcohol was examined by dipping the gas-permeable sheets in 100% ethanol. The results are shown in Table 5.

The tests for examining resistances to oil and alcohol were conducted by visually checking the appearance of the gas-permeable sheets everyday. Appearances as observed on a 14th day and 30th day after the commencement of the test are shown in Table 5.

As will be seen from Table 5, each sample showed excellent gas-permeability which was not greater than 50 sec per 100 ml air in² in terms of Gurley gas-permeability. The dipping test also showed superior results. The gas-permeable sheets showed good appearance even by the check on 30th day after the commencement of the test.

The freshness keeping agent parcelling film of the invention effectively prevents direct contact between the freshness keeping agent and the object such as food contained in the same container. In addition, the freshness keeping agent parcelling film of the invention offers an excellent freshness keeping effect by virtue of its small resistance to flow of gases.

Furthermore, the freshness keeping agent parcelling films of the present invention can overcome all the

TABLE 5

| | Sheet Material No. | Amount of addition of Fluoride Resin*1 | | Gas Permeability*3 | Anti-oil/anti-alcohol characteristics (appearance of sheet dipped in oil/alcohol*2 | | | |
|---|---|---|---|---|---|---|---|---|
| | | | | | Soybean oil | | 100% ethanol | |
| | | Liquid amount | Resin Amount | | 14 days | 30 days | 14 days | 30 days |
| Example 2 | A | 25 | 0.5 | 9 | 5 | 4 | 5 | 4 |
| | | 50 | 1 | 10 | 5 | 5 | 5 | 5 |
| | B | 25 | 0.5 | 12 | 5 | 4 | 5 | 4 |
| | | 50 | 1 | 13 | 5 | 5 | 5 | 5 |
| | C | 25 | 0.5 | 14 | 5 | 4 | 5 | 4 |
| | | 50 | 1 | 14 | 5 | 5 | 5 | 5 |

*1Weight parts per 100 weight parts of the sheet
*2Appearances as observed on 14th day and 30th day after commencement of test.
Point 5: No impregnation with oil or ethanol found.
Point 4: Impregnation with oil or ethanol observed in small part of parcelling material.
Point 3: Parcelling material locally impregnated with oil or ethanol.
Point 2: Most part of parcelling material was impregnated with oil or ethanol.
Point 1: Whole of parcelling material was impregnated with oil or ethanol.
*3Gas-permeability: Gurley gas permeability, unit sec/100 ml in²

EXAMPLE 6

Gas-permeable sheets, i.e., parcelling films, were prepared by the same vacuum forming methods as Example 2 from the sheets obtained in Example 5. The thus obtained parcelling films were used in soybean shelving test which was conducted under the same conditions as Example 3. Conditions of forming into the formed members, states of forming and de-oxidation time measured during the shelving test are shown in Table 6.

TABLE 6

| Parcelling Film No. | Sheet Material | Forming Condition | | States of Forming | De-oxidation time (Hr) |
|---|---|---|---|---|---|
| | | Form Roll Temp. (°C.) | Forming Time (sec) | | |
| 21 | A | 124 | 1 | Forming possible | 40 |
| 22 | B | 128 | 1 | Forming possible | 39 |
| 23 | C | 138 | 1 | Forming possible | 40 |

As will be fully realized from the foregoing description, the freshness keeping agent parcelling film in accordance with the present invention, intended for isolating a freshness keeping agent and an object to be preserved from each other in a common container, exhibits a very excellent gas-permeability and superior waterproofness, thus ensuring that the freshness of the object is kept for a long time.

In contrast to known parcelling materials which employ combinations of a variety of materials and elements to meet various requirements, the parcelling material of the present invention employs a single element which has been fully examined and tested and which has a superior formability, while exhibiting strength and rigidity high enough to ensure safe maintenance of the freshness keeping agent.

problems encountered with conventional materials, such as degradation of appearance of the object, spot-like contamination of the freshness keeping agent due to transfer of the object to the freshness keeping agent, and contamination of the object due to transfer of the freshness keeping agent, which problems being often experienced particularly when the object is a powdered or liquid food.

The freshness keeping agent parcelling film of the present invention can suitably be used in combination with various products which are to be preserved for long periods of time, such as foods having high water contents, foods having various forms such as fine powder, ordinary powder, particles, grains, granules, fine strips, scales, and so forth, as well as medicines of similar forms, and so forth.

The freshness keeping agent parcelling film of the present invention, particularly when impregnated or coated with fluororesin, exhibits a good barrier effect against permeation of alcohol and oil, so that it can suitably be used in keeping freshness of goods such as spirits, oils, oil-containing foods, alcohol-containing foods and so on.

What is claimed is:

1. A method of producing a gas-permeable parcelling film for use in a container for isolating a product to be preserved from a freshness keeping agent placed within the container, comprising the steps of:
   subjecting plastic fibers formed from at least one of polyolefins, polyamides, polyesters and copolymers of the aforementioned to a paper-making process and a drying process to obtain a sheet of said plastic fibers;
   impregnating said sheet of plastic fibers with a fluororesin to obtain a fluororesin impregnated sheet;
   drying said fluororesin impregnated sheet; and
   forming said fluororesin impregnated sheet into a predetermined shape to obtain said parcelling film.

2. A method according to claim 1 wherein said paper-making process comprises the steps of:

suspending said plastic fibers in water to obtain a liquid suspension of fibers;
introducing said liquid suspension to a paper-making machine so as to filter said liquid to obtain a filtrate; and
dehydrating said fibers by vacuum suction.

3. A method according to claim 1 wherein, before said forming step, said fluororesin impregnated sheet is further pressed by a heat roll.

4. A method according to claim 3 wherein pressing by said heat roll is effected at a temperature of about 120° to 140° C. and a pressure of about 0.5 to 6 kg/cm².

5. A method according to claim 1 wherein said sheet is impregnated by contacting said sheet with an emulsion formed by dispersing said fluororesin in an aqueous solution or a solution formed by dissolving said fluororesin in a solvent.

6. A method according to claim 1 wherein said forming step is effected at a temperature of about 60° to 200° C. and a pressure of about 0.1 to 5 kg/cm² for a period of about 0.1 to 180 seconds.

7. A method according to claim 1 wherein said forming step is effected at a temperature of about 60° to 200° C. and a pressure of about 100 to 700 mm Hg for a period of time of about 0.1 to 150 seconds.

8. A method according to claim 1, wherein the width of said plastic fibers is not greater than 50 and the length of said plastic fibers ranges between 0.1 and 200 mm.

9. A method according to claim 1, wherein said fluororesin is contained in amount of 0.1 to 10 weight parts per 100 weight parts of said plastic fiber.

10. A method according to claim 1 wherein said fibers are formed from materials comprising at least one of polyethylene, polypropylene and copolymers thereof.

11. A method according to claim 1 wherein said fluororesin comprises a resin of ethylene tetrafluoride, ethylene tetrafluoride-propylene hexafluoride copolymer, ethylene tetrafluoride-fluoroalkoxyethylene copolymer, ethylene trifluoride and derivatives of the foregoing.

12. A method of producing a gas-permeable parcelling film for use in a container for isolating a product to be preserved from a freshness keeping agent placed within the container, comprising the steps of:
subjecting plastic fibers formed from at least one of polyolefins, polyamides, polyesters and copolymers of the aforementioned to a paper-making process;
drying said fibers to form a sheet of plastic fibers;
impregnating said sheet of fibers with a fluororesin to obtain a fluororesin impregnated sheet;
drying said fluororesin impregnated sheet of said plastic fibers; and
forming said fluororesin impregnated sheet into a predetermined shape to obtain said parcelling film.

13. A method according to claim 12 wherein the fluororesin comprises a resin of ethylene tetrafluoride, ethylene tetrafluoride-propylene hexafluoride copolymer, ethylene tetrafluoride-fluoroalkoxyethylene copolymer, ethylene trifluoride and derivatives of the foregoing.

14. A method according to claim 12 wherein said paper-making process comprises the steps of:
suspending said plastic fibers in water to obtain a liquid suspension of fibers;
introducing said liquid suspension to a paper-making machine so as to filter said liquid to obtain a filtrate; and
dehydrating said fibers by vacuum suction.

15. A method according to claim 12 wherein, before said forming step, said fluororesin impregnated sheet of said plastic fibers is further pressed by a heat roll.

16. A method according to claim 15 wherein pressing by said heat roll is effected at a temperature of about 120° to 140° C. and a pressure of about 0.5 to 6 kg/cm².

17. A method according to claim 12 wherein said sheet is impregnated by contacting said sheet with an emulsion formed by dispersing said fluororesin in an aqueous solution or a solution formed by dissolving said fluororesin in a solvent.

18. A method according to claim 12 wherein after drying and before said forming step, said sheet of plastic fibers is pressed by a heat roll.

19. A method according to claim 12 wherein said forming step is effected at a temperature of about 60° to 200° C., and a pressure of about 0.1 to 5 kg/cm² for a period of about 0.1 to 180 seconds.

20. A method according to claim 12 wherein said forming step is effected at a temperature of about 60° to 200° C., and a pressure of about 100 to 700 mm Hg for a period of about 0.1 to 150 seconds.

21. A method according to claim 12, wherein the width of said plastic fibers is not greater than 50μ, and the length of said plastic fibers ranges between 0.1 and 200 mm.

22. A method according to claim 12, wherein said fluororesin is contained in amount of 0.1 to 10 weight parts per 100 weight parts of said plastic fiber.

23. A method of producing a gas-permeable parcelling film for use in a container for isolating a product to be preserved from a freshness keeping agent placed within the container, comprising the steps of:
(a) subjecting plastic fibers formed from at least one material selected from the group consisting of polyolefins, polyamides, polyesters and copolymers of the aforementioned and having a width of not greater than 50μ, and a length ranging between 0.1 and 200 mm to a paper-making process and a dehydrating step to obtain a sheet of fibers said paper-making process comprising the steps of:
(i) suspending said plastic fibers in water to obtain a liquid suspension of fibers;
(ii) introducing said liquid suspension to a paper-making machine so as to separate said liquid from said plastic fibers; and
(iii) dehydrating said fibers by vacuum suction;
(b) impregnating said sheet of fibers with a fluororesin to obtain a sheet of fluororesin impregnated fibers, said fluororesin being contained in an amount of 0.1 to 10 parts by weight per 100 parts by weight of said plastic fibers;
(c) drying said sheet of fluororesin impregnated fibers;
(d) pressing said sheet of fluororesin impregnated plastic fibers with a heat roll at a temperature of about 120° to 140° C. and a pressure of about 0.5 to 6 kg/cm² so as to provide pores with diameter not greater than 50μ; and
(e) forming said sheet into a predetermined shape at a temperature of about 60° to about 200° C., and a pressure of about 0.1 to 5 kg/cm² for a period of about 0.1 to 180 seconds, or at a temperature of about 60° to about 200° C., and a pressure of about 100 to about 700 mm Hg for a period of about 0.1 to 150 seconds to obtain said parcelling film.

24. A method according to claim 23 wherein the fluororesin comprises a resin of ethylene tetrafluoride, ethylene tetrafluoride-propylene hexafluoride copolymer, ethylene tetrafluoride-fluoroalkoxyethylene copolymer, ethylene trifluoride and derivatives of the foregoing.

25. A method according to claim 23, wherein said freshness keeping agent is a deoxidizing agent.

26. A method according to claim 23 wherein said fibers are formed from materials comprising at least one of polyethylene, polypropylene and copolymers thereof.

27. A method according to claim 23 wherein said sheet of fibers is impregnated by contacting said sheet of fibers with an emulsion formed by dispersing said fluororesin in an aqueous solution or a solution formed by dissolving said fluororesin in a solvent.

28. A method according to claim 2 wherein the water in which said plastic fibers are suspended contains polyvinyl alcohol.

* * * * *

UNITED STATES PATENT AND TRADEMARK OFFICE
CERTIFICATE OF CORRECTION

PATENT NO. : 5,019,212

DATED : May 28, 1991

INVENTOR(S) : Morita et al

It is certified that error appears in the above-identified patent and that said Letters Patent is hereby corrected as shown below:

Claim 8, Column 15, line 28, after "50" insert --$\mu$--.

Signed and Sealed this

Twelfth Day of January, 1993

Attest:

DOUGLAS B. COMER

*Attesting Officer*     *Acting Commissioner of Patents and Trademarks*